(No Model.)

C. H. THURSTON.
Loose Wheel Connection for Shafts.

No. 240,200. Patented April 12, 1881.

Witnesses.
Laurence F. Connor.
Arthur Reynolds

Inventor.
Charles H. Thurston
by Crosby & Gregory Attys.

UNITED STATES PATENT OFFICE.

CHARLES H. THURSTON, OF MARLBOROUGH, NEW HAMPSHIRE.

LOOSE-WHEEL CONNECTION FOR SHAFTS.

SPECIFICATION forming part of Letters Patent No. 240,200, dated April 12, 1881.

Application filed December 28, 1880. (No model.)

*To all whom it may concern:*

Be it known that I, CHARLES H. THURSTON, of Marlborough, county of Cheshire, and State of New Hampshire, have invented a new and useful Improvement in Loose-Wheel Connections for Shafts, of which the following description, in connection with the accompanying drawings, is a specification.

This invention relates to improvements in loose-wheel connections for shafts of sewing and other machines, wherein it is desired to rotate the driving or fly wheel at times without rotating the shaft upon which it is mounted—as, for instance, when winding bobbins.

My invention in this class of mechanism consists, essentially, of a shaft provided at one end with a longitudinal recess to receive within it a roll-carrier having a curved seat on which is placed a loose wheel or roll, the periphery of the wheel or roll being adapted at times to be forced through a slot at the periphery of the shaft and act against the interior of the hub of the driving or fly wheel, placed on the said shaft, as hereinafter described, the wheel or roll when so forced out engaging and holding the fly-wheel fast on and so as to turn the shaft on which it is placed.

Figure 1:
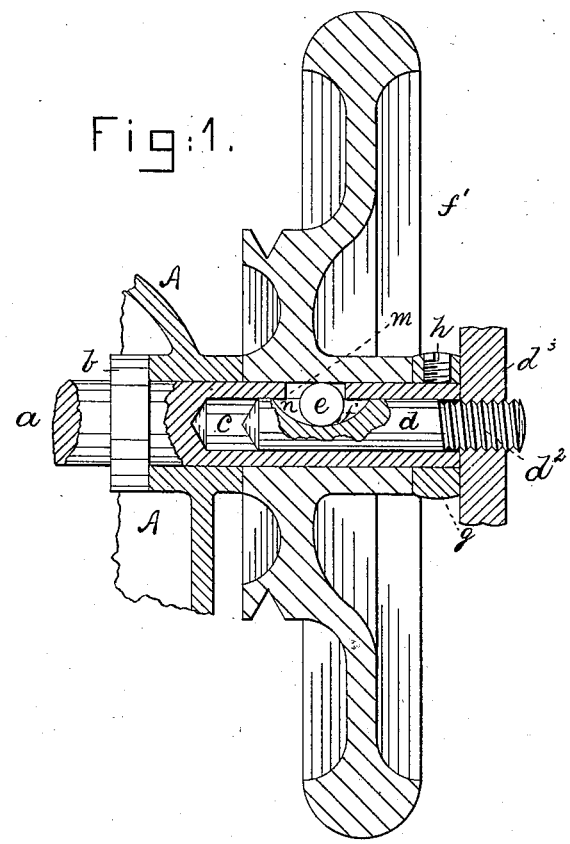
Figure 3:
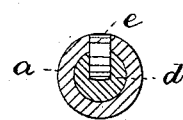
Figure 2:
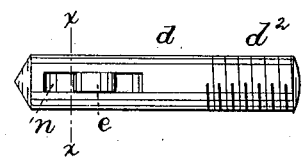

Figure 1 is a partial sectional view of a fly-wheel, shaft, wheel or roll, and its carrier, the latter being shown in the position it will occupy when the fly-wheel is left free to run loosely on the shaft. Fig. 2 is a top view of the wheel or roll and its carrier removed from the recess in the shaft, and Fig. 3 is a section of Fig. 2 on the dotted line $x\ x$.

The letter $a$ is supposed to represent the upper shaft of a sewing or other machine, it having bearings in the frame A, and being provided with a collar, $b$. The end of shaft $a$ is bored out or recessed, as at $c$, to receive the carrier $d$ for the wheel or roll $e$, the edge or periphery of which rests upon or in the concaved seat $f$ of the said carrier, as in Fig. 1, the edge of the said wheel or roll opposite the said seat being extended through a slot, $m$, in the shaft $a$, and bearing against the interior of the hub of the driving or fly wheel $f'$, placed loosely on the said shaft, and prevented from sliding therefrom by the collar $g$, outside the said wheel, the said collar being held by the set-screw $h$. The carrier $d$ has at its outer end a screw-thread, $d^2$, to receive the adjusting-nut $d^3$. Movement of the carrier toward the right by the nut $d^3$ will cause its concaved seat to act on and force the wheel or roll $e$ outward through the slot $m$, and so closely in contact with the interior of the hub of the driving-wheel as to lock the said wheel and shaft together, causing them to turn in unison. When it is desired that the wheel $f'$ run loose on the shaft, the carrier will be moved by the nut $d^3$ until the wheel or roll occupies a position at the lowest portion of the concaved seat $n$.

I do not broadly claim a wheel or ball to be jammed between two surfaces to lock them together.

I claim—

The driving-wheel, the shaft $a$, recessed and provided with the slot $m$, the wheel or roll, and the carrier provided with the concaved seat to receive the said wheel or roll, combined with the nut to move the said carrier longitudinally and force the said wheel or roll against the interior of the hub of the said driving-wheel, all substantially as described.

In testimony whereof I have signed my name to this specification in the presence of two subscribing witnesses.

CHARLES H. THURSTON.

Witnesses:
G. W. GREGORY,
ARTHUR REYNOLDS.